Aug. 26, 1952     H. J. EVERETT     2,608,424
STUFFING BOX
Filed Nov. 5, 1947
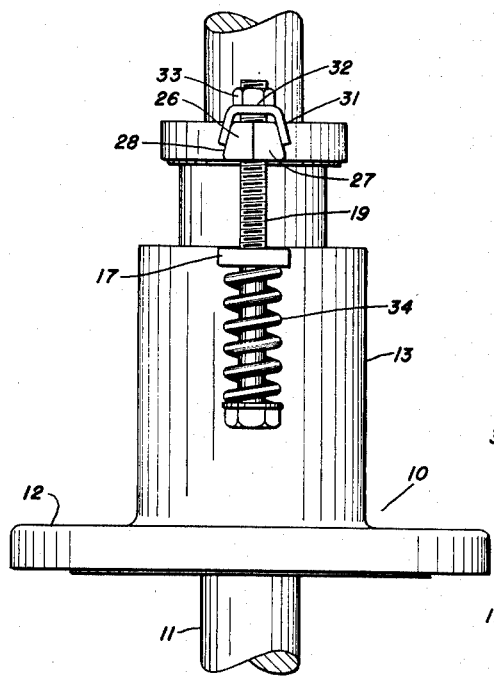
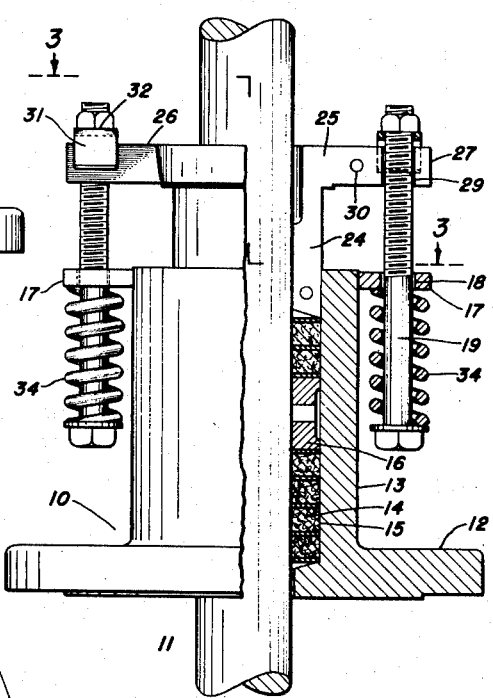
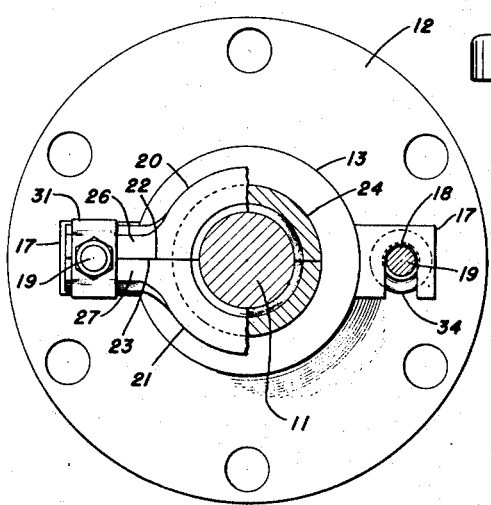
INVENTOR.
HARVEY J. EVERETT
BY
*Edward H. Cumpston*
ATTORNEY Patented Aug. 26, 1952

2,608,424

UNITED STATES PATENT OFFICE 2,608,424

STUFFING BOX

Harvey J. Everett, Rochester, N. Y., assignor to Mixing Equipment Co., Inc., Rochester, N. Y., a corporation of New York Application November 5, 1947, Serial No. 784,133

3 Claims. (Cl. 286—32)

This invention relates to stuffing boxes for shafts and the like, one object of the invention being to provide an improved stuffing box having a more practical and efficient type of construction.

Another object is the provision of a stuffing box having a split gland with means for maintaining a close fitting engagement of the gland sections with the shaft and simultaneously pressing the gland sections against the packing.

Other objects are to provide a stuffing box of the above character having gland parts adapted to be readily assembled in the stuffing box and removed therefrom, as well as a stuffing box having few parts of simple and practical construction capable of being readily manufactured at low cost.

To these and other ends the invention resides in certain improvements and combinations of parts, all as will be hereinafter more fully described, the novel features being pointed out in the claims at the end of the specification.

In the drawings:

Fig. 1 is a side elevation of a stuffing box and gland embodying the present invention;

Fig. 2 is a side elevation as viewed from the right in Fig. 1, with parts in central section, and Fig. 3 is a top plan view partly in section on the line 3—3 in Fig. 2.

The preferred embodiment of the invention, herein disclosed by way of illustration, comprises a stuffing box, indicated generally at 10 for a rotary shaft 11, the stuffing box having a flange 12 for attachment to a container or other apparatus into which the shaft 11 extends. Flange 12 carries a packing cylinder or sleeve 13 surrounding the shaft in spaced relation so as to provide a chamber 14 containing the usual packing rings 15 and lantern ring 16, as well understood in the art. Cylinder 13, adjacent its top, has a pair of laterally projecting brackets 17 formed with openings 18 for bolts 19 for attaching the gland parts, as hereafter more fully described. Openings 18 may be cut through the sides of the brackets, as shown in Fig. 3, to facilitate the engagement of the bolts therewith.

The gland is of the split type comprising a pair of half sections, 20 and 21, with diametrically arranged meeting surfaces, 22 and 23, respectively, as shown. Each gland section comprises a semi-cylindrical sleeve portion, as 24, and a flange portion 25, the flange portion of each section having oppositely extending lugs, as 26 and 27. Each lug has one side thereof lying in the meeting surface of the corresponding section and the other side 28 inclined outwardly away from such surface, so that the lug is tapered outwardly from top to bottom, as shown. The meeting surfaces between the lugs are recessed to provide openings, as 29, for the reception therebetween of the bolts 19. For holding them in more precisely registered relation, the gland sections are equipped with dowel pins 30 and openings therefor, preferably located between both the sleeve and flange portions and on each side of the shaft 11, as shown.

Means are provided for cooperation with each mating pair of tapered gland lugs for simultaneously maintaining the gland sections in closely fitting engagement with the shaft and pressing them against the packing in the stuffing box. Such means preferably comprises a clamp 31 for each pair of lugs, the clamp being preferably in the form of a substantially channel-shaped clip having a flat central portion 32 formed with a bolt opening and opposite end portions inclined outwardly to slidably engage and embrace therebetween the tapered surfaces 28 of the corresponding pair of lugs. Means are provided for resiliently pressing the clamps against the lugs, as will now be described.

The bolts 19 for attaching the gland to the stuffing box are passed at their upper ends through the bolt openings 29 in the corresponding pairs of gland lugs and through the bolt openings in the clamps 31 and have their upper ends equipped with adjusting nuts 33 bearing against the flat central portions of the clamps. The headed lower ends of the bolts are spaced below the stuffing box brackets 17 and coiled compression springs 34 are carried by the bolts between their heads and the brackets 17 for resiliently drawing the bolts downwardly to press the clamps down against the gland lugs with a pressure which may be adjusted by turning the bolt nuts 33. By means of the coacting inclined surfaces of the clamps and gland lugs, such pressure draws the gland sections together with closely fitting engagement with the shaft and simultaneously presses the gland sections against the packing in the stuffing box. If so desired, the gland sections may have their meeting surfaces formed in slightly spaced relation with each other to provide more or less clearance for progressively drawing the sections together to take up for wear in the surfaces engaged by the shaft.

It is evident from the above described construction that the gland sections may be readily assembled and disassembled in relation to both the shaft and the stuffing box cylinder and, in assembled relation, the gland sections are resiliently maintained in the desired close fitting engagement with the shaft, as well as with the desired pressure against the packing, both of these functions being simultaneously accomplished and adjusted by the bolt and clamp means described. The assembly comprises comparatively few parts, of simple construction, adapted to be readily manufactured at low cost.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A stuffing box comprising a packing cylinder having laterally extending brackets formed with bolt receiving openings, a split gland having half-sections each comprising a sleeve portion and a flange portion, said flange portions having oppositely extending pairs of cooperating lugs, said lugs of each pair having adjacent sides recessed to form a bolt opening therebetween and the other sides thereof inclined outwardly away from said surfaces, a clamp formed with a bolt opening and having outwardly inclined portions embracing therebetween the inclined sides of each pair of lugs, bolts extending through said bolt openings in said gland lugs and clamps and slidably engaging said brackets, the upper ends of the bolts being provided with adjusting nuts bearing against the clamps, the lower headed ends of the bolts being extended below the brackets, and coiled compression springs being interposed between said bolt heads and brackets for resiliently drawing said bolts downwardly and pressing said clamps against said lugs for pressing said gland sections into said packing cylinder and into closely fitting engagement with a shaft passing through said box.

2. In a stuffing box, a split gland having half-sections each comprising a sleeve portion and a flange portion, said flange portions having oppositely extending pairs of cooperating lugs, said lugs of each pair having adjacent sides recessed to form a bolt opening therebetween and the other sides thereof inclined outwardly away from said surfaces, and a generally channel-shaped clip having outwardly inclined portions embracing therebetween the inclined sides of each pair of lugs, said clips being formed adjacent the central portions thereof with bolt openings registering with the bolt openings of the pairs of lugs, respectively, bolts extending through said bolt openings in said gland lugs and clips and engaging said stuffing box for securing said gland sections to said stuffing box, whereby said gland sections are drawn together and maintained in closely fitting engagement with a shaft passing through said box while pressing against the packing in said box.

3. In a stuffing box, a split gland having half-sections each comprising a sleeve portion and a flange portion, said flange portions having oppositely extending pairs of cooperating lugs, said lugs of each pair having adjacent sides recessed to form a bolt opening therebetween and the other sides thereof inclined outwardly away from said surfaces, a clamp having outwardly inclined portions embracing therebetween the inclined sides of each pair of lugs, said clamps being formed with bolt openings registering with the bolt openings of the pairs of lugs, respectively, bolts extending through said bolt openings in said gland lugs and clamps and engaging said stuffing box, said bolts being provided with springs for moving the same longitudinally to press the clamps against the lugs of the gland sections and maintain said sections in closely fitting engagement with a shaft passing through said box while pressing said gland sections against the packing in said box.

HARVEY J. EVERETT.

REFERENCES CITED

The following references are of record in the file of this patent:

UNITED STATES PATENTS

| Number | Name | Date |
|---|---|---|
| 621,817 | Hopkins | Mar. 28, 1897 |
| 757,597 | Caldwell | Apr. 19, 1904 |
| 1,055,166 | Guy | Mar. 4, 1913 |
| 1,081,273 | McLellan | Dec. 9, 1913 |
| 1,740,997 | McGuire | Dec. 24, 1924 |
| 1,757,311 | Kahle | May 6, 1930 |
| 2,295,490 | Sandherr | Sept. 8, 1942 |